(12) United States Patent
Gorecha et al.

(10) Patent No.: US 8,880,945 B2
(45) Date of Patent: Nov. 4, 2014

(54) CUSTOMER PREMISES EQUIPMENT DIAGNOSTIC, RECOVERY, AND REPORTING SYSTEMS AND METHODS

(75) Inventors: Saurabh Gorecha, Adambakkam (IN); Arjun Baskaran, Velachery (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 372 days.

(21) Appl. No.: 13/313,656

(22) Filed: Dec. 7, 2011

(65) Prior Publication Data

US 2013/0151893 A1 Jun. 13, 2013

(51) Int. Cl.
*G06F 11/00* (2006.01)
(52) U.S. Cl.
USPC .................................. 714/26; 714/4.1; 714/4.4
(58) Field of Classification Search
USPC .................. 714/4.1, 4.3, 4.4, 25, 26, 30, 38.1, 714/38.14, 47.1, 57
See application file for complete search history.

(56) References Cited

U.S. PATENT DOCUMENTS

| 7,487,406 B2* | 2/2009 | Kobrosly et al. | 714/49 |
| 7,594,252 B2* | 9/2009 | Johnson et al. | 714/4.3 |
| 2005/0015678 A1* | 1/2005 | Miller | 714/38 |
| 2013/0007527 A1* | 1/2013 | Petukhov et al. | 714/37 |

* cited by examiner

*Primary Examiner* — Joseph D Manoskey

(57) ABSTRACT

Exemplary customer premises equipment ("CPE") diagnostic, recovery, and reporting systems and methods are disclosed herein. An exemplary method includes a technical support server subsystem aggregating, over time, technical support data representing technical issues of CPE devices and operations performed to resolve the technical issues, identifying a subset of the technical support data, and providing the identified subset of the technical support data to a CPE device for local storage by the CPE device, locally stored technical support data configured to be used by the CPE device to self-recover from a future technical issue associated with the CPE device. In certain embodiments, the CPE device may be configured to function as a media server device and/or as an intermediary technical support device at a customer premises. Corresponding methods and systems are also disclosed.

22 Claims, 11 Drawing Sheets

CUSTOMER PREMISES EQUIPMENT DIAGNOSTIC, RECOVERY, AND REPORTING SYSTEMS AND METHODS

BACKGROUND INFORMATION

The advent of set-top box devices and other customer premises equipment ("CPE") devices has provided users with access to a variety of services (e.g., television services, Internet services, telephone services, data services, etc.). For example, a user may utilize a set-top box device to access broadcast television services, pay-per-view services, video-on-demand services, Internet services, and audio programming services.

However, CPE devices and/or corresponding service providers inevitably experience technical issues that result in service and/or service feature disruptions for users. In order to address the technical issues, users may be forced to contact a service provider's technical support department, such as by making telephone calls directly to the technical support department to report technical issues to technical support agents, who will then work with the users to resolve the technical issues. This process may be inconvenient, time-consuming, and/or frustrating for the users, thereby leading to dissatisfaction with the service provider. Moreover, the service provider is forced to expend resources to staff its technical support department with sufficient technical support personnel to handle incoming calls from users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary customer premises equipment ("CPE") diagnostic, recovery, and reporting systems and methods are disclosed herein. The exemplary systems and methods described herein may facilitate efficient, effective, convenient, transparent, timely, and/or cost-conservative recovery from technical issues experienced by CPE devices. These and additional or alternative benefits and/or advantages that may be provided by the exemplary systems and methods will be made apparent herein.

As used herein, the term "technical issue" may refer to any problem and/or cause of a problem that affects functionality of a CPE device, including an ability of the CPE device to access a service and/or a service feature provided by a service provider for access by the CPE device. Examples of technical issues are described herein.

As used herein, the phrases "recover from a technical issue" and "recovery from a technical issue" may refer to any correction, fixing, or healing of a technical issue affecting a CPE device in a way that improves a functionality of the CPE device, such as by restoring an ability of the CPE device to access a service and/or a service feature provided by a service provider. A "recovery process" may refer to a performance of one or more recovery operations to attempt to correct, fix, heal, resolve, or otherwise recover from a technical issue.

Exemplary CPE diagnostic, recovery, and reporting support systems and methods will now be described in reference to the drawings.

Figure 1:
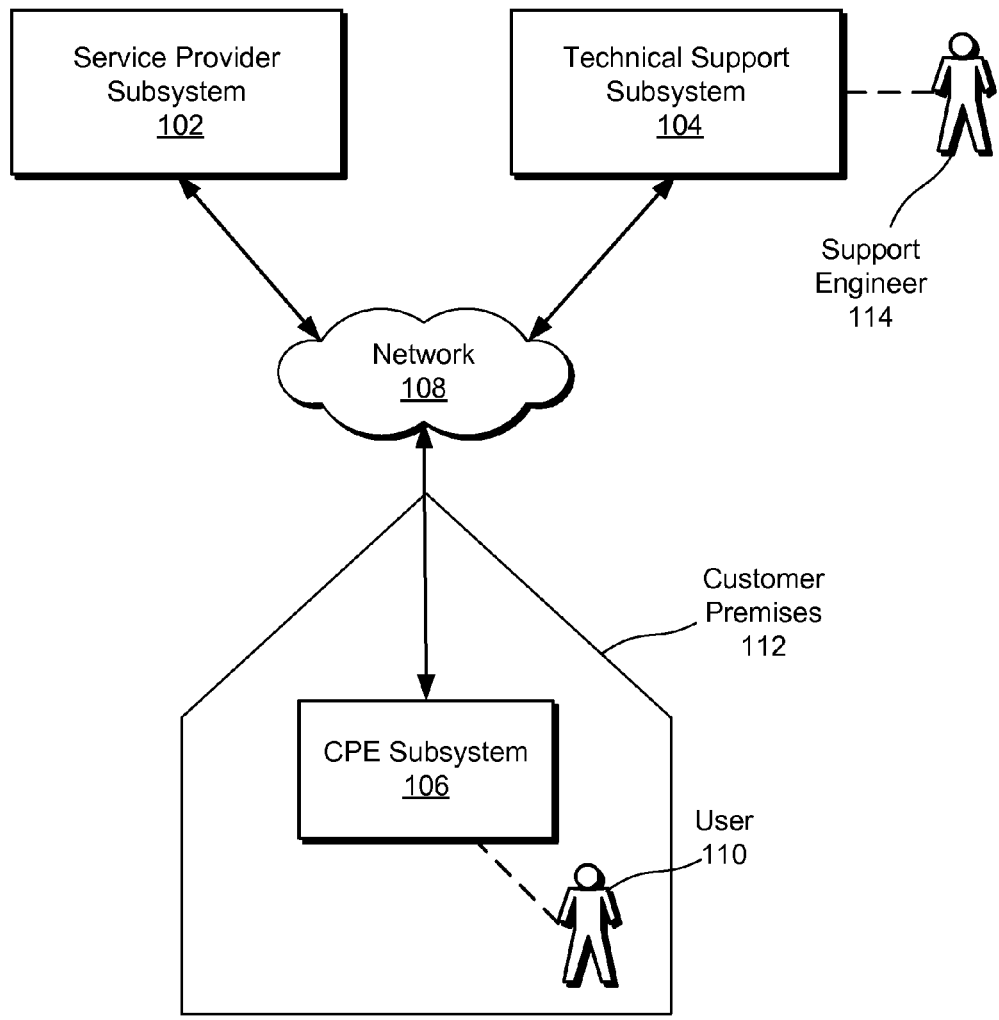
FIG. 1 illustrates an exemplary customer premises equipment ("CPE") diagnostic, recovery, and reporting system according to principles described herein.

FIG. 1 illustrates an exemplary CPE diagnostic, recovery, and reporting system 100 ("system 100"). As shown, system 100 may include a service provider server subsystem 102 ("provider subsystem 102"), a technical support server subsystem 104 ("technical support subsystem 104"), and a CPE subsystem 106 communicatively coupled by way of a network 108. Provider subsystem 102, technical support subsystem 104, and CPE subsystem 106 may communicate one with another using any suitable communications technologies capable of support remote data communications. Examples of such communication technologies include, without limitation, Global System for Mobile Communications ("GSM") technologies, Long Term Evolution ("LTE") technologies, Code Division Multiple Access ("CDMA") technologies, Time Division Multiple Access ("TDMA") technologies, Evolution Data Optimized Protocol ("EVDO") (e.g., "1xEVDO"), radio frequency ("RF") signaling technologies, radio transmission technologies (e.g., One Times Radio Transmission Technology ("1xRTT")), Transmission Control Protocol ("TCP"), Internet Protocol ("IP"), Session Initiation Protocol ("SIP"), Real-Time Transport Protocol ("RTP"), User Datagram Protocol ("UDP"), Hypertext Transfer Protocol ("HTTP"), Hypertext Transfer Protocol Secure ("HTTPS"), Ethernet, wireless communications technologies, Simple Object Access Protocol ("SOAP"), Extensible Mark-up Language ("XML") and variations thereof, optical transport and signaling technologies, live transmission technologies (e.g., media streaming technologies), media file transfer technologies, in-band and out-of-band signaling technologies, and other suitable communications technologies.

Network 108 may include any network or combination of networks provided by one or more appropriately configured network devices (and communication links thereto) and over which communications and data may be transported between provider subsystem 102, technical support subsystem 104, and CPE subsystem 106. For example, network 108 may include, but is not limited to, a mobile phone network (e.g., a cellular phone network, a 3G network, a 4G network, etc.), a satellite media network (e.g., a broadcasting network, a terrestrial media broadcasting network, etc.), a media content distribution network (e.g., a subscriber television network, a media broadcasting, multicasting, and/or narrowcasting network, etc.), a telecommunications network, the Internet, a wide area network, any other network capable of transporting communications and data between provider subsystem 102, technical support subsystem 104, and CPE subsystem 106, and/or any combination or sub-combination thereof.

Provider subsystem 102 may include or be implemented by one or more server-side computing devices controlled by (e.g., operated by) a service provider such as a media content and/or communications service provider. Similarly, technical support subsystem 104 may include or be implemented by one or more server-side computing devices controlled by (e.g., operated by) a technical support provider. In certain examples, the service provider controlling provider subsystem 102 and the technical support provider controlling technical support subsystem 104 may be the same entity or under the control of the same entity. In other examples, technical support provider may be a separate entity commissioned by the service provider to provide technical support services for one or more of the services provided by service provider over network 108.

CPE subsystem 106 may include or be implemented by one or more client-side computing devices controlled by (e.g., operated by) a user 110. The client-side computing devices may be located at a customer premises 112 (e.g., home and/or business building structure) and may be referred to as CPE devices. Examples of such devices may include, without limitation, a personal computer, a mobile phone, a smart phone, a tablet computer, a set-top box device, a digital video recorder ("DVR") device, a gaming device, a portable media player device, a mobile computing device, and any other computing device configured to access a service provided by provider subsystem 102. In certain examples, CPE subsystem 106 may include multiple discrete, and in certain implementations heterogeneous, CPE devices located at customer premises 112 and configured to communicate with one another by way of a local area network ("LAN") (e.g., a Wi-Fi and/or other wireless network) at customer premises 112. An exemplary configuration of CPE devices at a customer premises is described in more detail herein.

Provider subsystem 102 may be configured to provide one or more services over network 108. For example, provider subsystem 102 may provide, for access by way of network 108, one or more media content services (e.g., television broadcast, multicast, and/or narrowcast services, pay-per-view media content services, on-demand media content services, media content sharing services, video programming services, audio programming services, etc.), digital content management services (e.g., cloud-based content storage, management, and access services), data services (e.g., data network access services), Internet services, communications services (e.g., telephone services, text messaging services, email messaging services, instant messaging services, etc.), and/or any other service as may serve a particular implementation.

User 110 may utilize CPE subsystem 106 to access one or more services provided by provider subsystem 102 over network 108. Accordingly, user 110 may be an end user of one or more services provided by provider subsystem 102. While FIG. 1 illustrates a single user 110 associated with a single CPE subsystem 106 at a single customer premises 112, this is for illustrative purposes only. Provider subsystem 102 may be configured to provide services for access by any number of CPE subsystems 106 and associated users 110 located at any number of customer premises 112.

Occasionally, CPE subsystem 106 may experience a technical issue that may affect the ability of the CPE subsystem 106 to access a service and/or service feature provided by provider subsystem 102 or to perform one or more operations related to the service and/or service feature. For example, a technical issue may cause media content accessed through a media content service to be presented incorrectly, unsatisfactorily, and/or in an unintended manner. For example, a media content program such as a television program or a movie accessed through a media content service may not be visible to user 110 on a display screen of a CPE device included in CPE subsystem 106 because of a technical issue experienced by CPE subsystem 106.

CPE subsystem 106 and technical support subsystem 104 may be configured to perform one or more of the diagnostic, recovery, and reporting processes described herein to facilitate efficient, effective, convenient, transparent, timely, and/or cost-conservative recovery from such technical issues. In some examples, the processes may facilitate recovery from technical issues with little or no interaction from user 110. For instance, technical issues may be resolved by CPE subsystem 106, technical support subsystem 104, and/or a support engineer 114 associated with technical support subsystem 104 without user 110 having to contact or interact with the support engineer 114 and/or other technical support personnel. In some cases, the processes may minimize technical support calls from CPE subsystem 106 to technical support subsystem 104 and/or support engineer 114. Exemplary components and operations of technical support subsystem 104 and CPE subsystem 106 will now be described.

Figure 2:
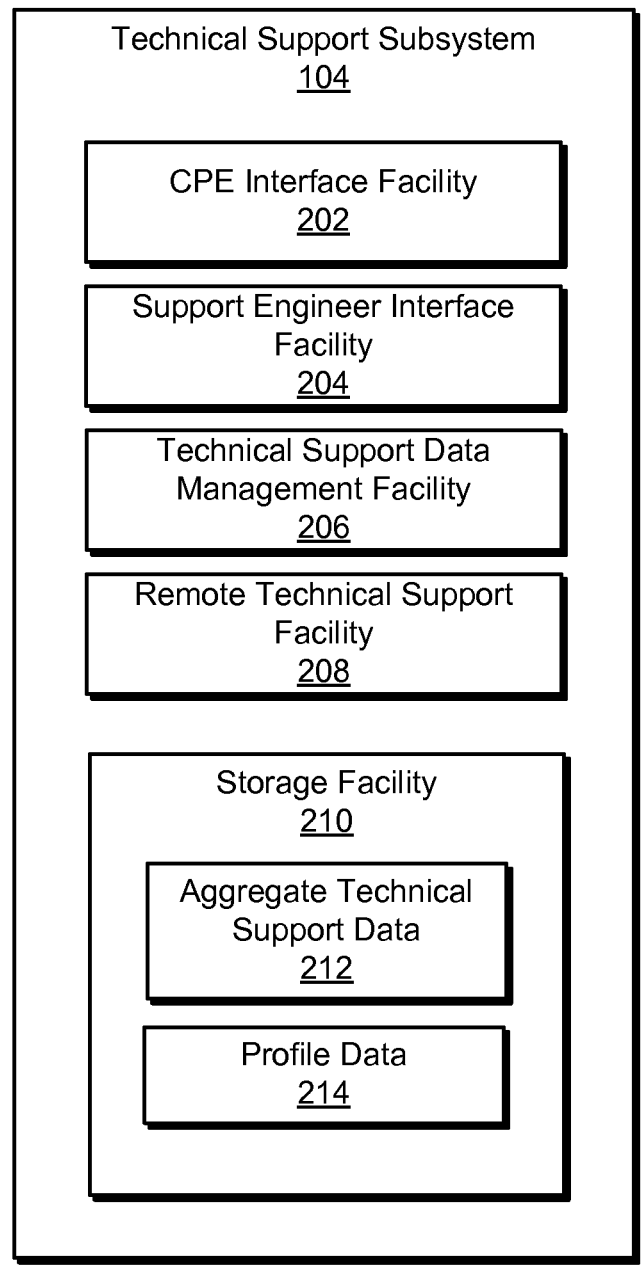
FIG. 2 illustrates exemplary components of a technical support subsystem of the system of FIG. 1 according to principles described herein.

FIG. 2 illustrates exemplary components of technical support subsystem 104. As shown, technical support subsystem 104 may include a CPE interface facility 202, a support engineer interface facility 204, a technical support data management facility 206, a remote technical support facility 208, and a storage facility 210. It will be recognized that although facilities 202-210 are shown to be separate facilities in FIG. 2, any of facilities 202-210 may be combined into fewer facilities, such as into a single facility, or divided into more facilities as may serve a particular implementation. Any suitable communication technologies, including any of the communication technologies mentioned herein, may be employed to facilitate communications between facilities 202-210.

CPE interface facility 202 may be configured to provide an interface through which technical support subsystem 104 may interface with CPE subsystem 106 over network 108. CPE interface facility 202 may employ any suitable technologies to provide such an interface.

Support engineer interface facility 204 may be configured to provide an interface through which technical support subsystem 104 may communicate with support engineer 114 and through which support engineer 114 may interact with technical support subsystem 104. Support engineer interface facility 204 may employ any suitable technologies to provide such an interface.

Technical support data management facility 206 may be configured to manage technical support data, which may include any data representative of and/or associated with technical issues of CPE subsystems (e.g., CPE subsystem 106) that access a service provided by provider subsystem 102, diagnostic information associated with the CPE subsystems, operations performed to attempt to resolve the technical issues (e.g., operations performed that succeeded in resolving technical issues and/or operations performed that failed to resolve the technical issues), and any other information associated with CPE subsystems and/or technical issues experienced by CPE subsystems.

Technical support data management facility 206 may be configured to aggregate and maintain technical support data in a database or other repository of aggregate technical support data. For example, technical support data management facility 206 may aggregate and store technical support data as aggregate technical support data 212 in storage facility 210, as shown in FIG. 2. Technical support data management facility 206 may be configured to aggregate technical support data over time. Accordingly, aggregate technical support data 212 may represent historical technical support data that has been aggregated over time.

Technical support data management facility 206 may be configured to receive technical support data from one or more sources for inclusion in the aggregation. For example, technical support data management facility 206 may be configured to receive technical support data provided by CPE subsystems (e.g., CPE subsystem 106) over network 108. For instance, technical support data management facility 206 may request and receive, from CPE subsystems, diagnostic data representing states of CPE subsystems. Technical support data management facility 206 may be configured to request diagnostic data from CPE subsystems periodically in accordance with a predetermined frequency and/or schedule and/or in response to a predetermined event. As another example, technical support data management facility 206 may be configured to receive technical support data from support engineer 114 through support engineer interface facility 204. For instance, when technical support subsystem 104 and CPE subsystem 106 are unable to resolve a technical issue on their own, support engineer 114 may participate to help resolve the technical issue. The support engineer 114 may then provide technical support data descriptive of the technical issue and operations performed to resolve the technical issue to technical support subsystem 104 through support engineer interface facility 204 for access and use by technical support data management facility 206.

Technical support data management facility 206 may be configured to identify a subset of aggregate technical support data 212 and to provide data representative of the subset of aggregate technical support data 212 to CPE subsystem 106, such as by transmitting data representative of the identified subset of aggregate technical support data 212 to CPE subsystem 106 through CPE interface facility 202 by way of network 108. Technical support data management facility 206 may be configured to provide the identified subset of technical support data to CPE subsystem 106 for local caching and use by CPE subsystem 106 to self-recover from a future technical issue experienced by CPE subsystem 106.

Technical support data management facility 206 may be configured to identify a particular subset of aggregate technical support data 212 for CPE subsystem 106. The particular subset of aggregate technical support data 212 may include technical support data that is more likely than other technical support data included in aggregate technical support data 212 to be of use to CPE subsystem 106. By providing such a select subset of technical support data to CPE subsystem 106, data storage resources of CPE subsystem 106 may be conserved while still providing CPE subsystem 106 with technical support data that is predicted by technical support data management facility 206 to be useful to CPE subsystem 106.

As an example, in certain embodiments, technical support data management facility 206 may be configured to identify a subset of aggregate technical support data 212 for CPE subsystem 106 based on a type or types of CPE devices included in CPE subsystem 106. A type of CPE device may refer to a particular make, model, computing platform (e.g., operating system platform), form factor, data connection (e.g., wireless or wireline data connection), controlling entity (e.g., managed or unmanaged by the service provider controlling provider subsystem 102), and/or any other attribute by which CPE devices may be distinguished by type from one another. Thus, technical support data management facility 206 may identify technical support data associated with a particular type of CPE device and provide the identified technical support data to CPE subsystem 106 when the same type of CPE device is included in CPE subsystem 106.

To this end, technical support data management facility 206 may be configured to maintain profile data 214 representative of information about a user and/or devices associated with CPE subsystem 106. Profile data 214 may include data indicating particular CPE devices and/or types of CPE devices included in CPE subsystem 106 and/or associated with user 110. Technical support data management facility 206 may generate or obtain profile data 214 from any suitable source in any suitable way. In some examples, technical support data management facility 206 may obtain profile data 214 from provider subsystem 102 and/or from CPE subsystem 106 (e.g., as part of diagnostics data provided by CPE subsystem 106 to technical support subsystem 104).

As another example, technical support data management facility 206 may be configured to identify a subset of aggregate technical support data 212 for CPE subsystem 106 by selecting a subset of the technical issues represented by aggregate technical support data 212 that are more commonly experienced by CPE subsystems than the remainder of the technical issues. Accordingly, technical support data management facility 206 may identify commonly experienced technical issues for inclusion in a subset of aggregate technical support data 212 to be provided to CPE subsystem 206.

Inasmuch as aggregate technical support data 212 may change over time (e.g., as new technical support data is received and added to aggregate technical support data 212), technical support data management facility 206 may be configured to provide updated technical support data to CPE subsystem 106 for caching and use by CPE subsystem 106. For example, technical support data management facility 206 may identify a new subset of aggregate technical support data 212 and provider the new subset of technical support data to CPE subsystem 106 for use by CPE subsystem 106 to update the technical support data locally cached within CPE subsystem 106.

Remote technical support facility 208 may be configured to perform one or more remote-recovery operations to assist CPE subsystem 106 to recover from a technical issue. To illustrate, technical support subsystem 104, by way of CPE interface facility 202, may receive a notification of a detected technical issue from CPE subsystem 106. In response to the notification, remote technical support facility 208 may perform one or more remote-recovery operations to help CPE subsystem 106 recover from the technical issue. To this end, remote technical support facility 208 may use the aggregate technical support data 212 to identify a remote-recovery operation that has been helpful historically and/or that may be helpful now to recover from the technical issue. Remote technical support facility 208 may then perform the identified remote-recovery operation.

A remote-recovery operation may include any operation performed by technical support subsystem 104 to help CPE subsystem 106 to recover from a technical issue. Examples of a remote-recovery operation may include, without limitation, technical support subsystem 104 directing CPE subsystem 106 to restart a process, reboot a CPE device, reset a connection, and/or perform any other operation to attempt to recover from a technical issue.

CPE subsystem 106 may receive remote-recovery directions from technical support subsystem 104 and perform one or more recovery operations as directed by technical support subsystem 104. In this or a similar manner, technical support subsystem 104 may remotely control and/or assist CPE subsystem 104 to recover from a technical issue experienced by CPE subsystem 106.

Remote technical support facility 208 may be configured to determine whether a remote-recovery operation succeeded or failed to recover CPE subsystem 106 from the technical issue. The determination may be made in any suitable way. For example, CPE subsystem 106 may be configured to notify technical support subsystem 104 of a success or a failure of a recovery operation initiated by technical support system 104. Accordingly, remote technical support facility 208 may be configured to determine whether the remote-recovery operation has succeeded or failed based on a notification received from CPE subsystem 106. As another example, remote technical support facility 208 may be configured to perform one or more follow-up operations to remotely determine whether CPE subsystem 106 has recovered from the technical issue. For instance, remote technical support facility 208 may direct, through CPE interface facility 202, CPE subsystem 106 to perform diagnostic operations and report diagnostic information to remote technical support facility 208.

If remote technical support facility 208 is unable to remotely recover CPE subsystem 106 from a technical issue, remote technical support facility 208 may notify support engineer 114, by way of support engineer interface facility 204, of the technical issue. Remote technical support facility 208 may provide any information about the technical issue and/or attempts to recover from the technical issue to support engineer 114 along with the notification.

Support engineer 114 may perform one or more actions to attempt to resolve the technical issue. After support engineer 114 has addressed (e.g., resolved or failed to resolve) the technical issue, support engineer 114 may provide technical support data input descriptive of the technical issue and/or one or more actions performed by support engineer 114 with respect to the technical issue to technical support subsystem 104 by way of support engineer interface facility 204. Technical support data management facility 206 may be configured to access such new technical support data provided by support engineer 114 and to add the new technical support data to the aggregate technical support data 212 stored in storage facility 210. In this or similar manner, technical support data management facility 206 may continue to aggregate technical support data over time, including by adding new technical support data provided by support engineer 114 and/or new technical support data received from any other source (e.g., CPE subsystems) to the aggregate technical support data 212. Accordingly, system 100 may be configured to function as an evolving and/or self-learning technical support system.

Storage facility 210 may be configured to store, in a database or other data repository, aggregate technical support data 212 representative of technical support data aggregated by technical support data management facility 206 and profile data 214 representative of user and/or device profiles. Storage facility 210 may be configured to maintain additional or alternative data, such as any other data disclosed herein.

Figure 3:
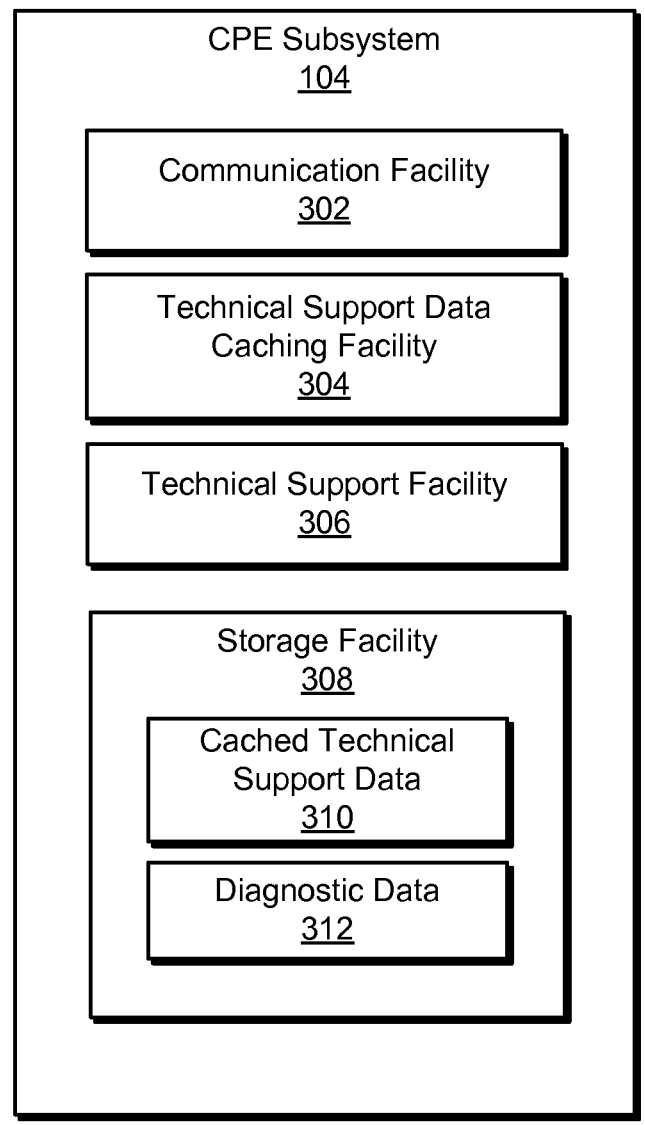
FIG. 3 illustrates exemplary components of a CPE subsystem of the system of FIG. 1 according to principles described herein.

FIG. 3 illustrates exemplary components of CPE subsystem 106. As shown, CPE subsystem 106 may include a communication facility 302, a technical support data caching facility 304, a technical support facility 306, and a storage facility 308. It will be recognized that although facilities 302-308 are shown to be separate facilities in FIG. 3, any of facilities 302-308 may be combined into fewer facilities, such as into a single facility, or divided into more facilities as may serve a particular implementation. Any suitable communication technologies, including any of the communication technologies mentioned herein, may be employed to facilitate communications between facilities 302-308.

Communication facility 302 may be configured to communicate with provider subsystem 102 and/or technical support subsystem 104 by way of network 108. Communication facility 302 may employ any suitable technologies for such communications.

Technical support data caching facility 304 may be configured to receive technical support data from technical support subsystem 104 and to cache the received technical support data in local storage. For example, the technical support data may be stored as cached technical support data 310 in storage facility 308, as shown in FIG. 3. As described above, the locally cached technical support data 310 may comprise a subset of the aggregate technical support data 212 selected and provided by technical support subsystem 104.

The locally stored technical support data 310 may be configured to be used by technical support facility 306 to attempt to self-recover from a future technical issue experienced by CPE subsystem 106. To illustrate, after technical support data caching facility 304 has received and stored cached technical support data 310, technical support facility 306 may be configured to detect a technical issue associated with CPE subsystem 106.

Technical support facility 306 may be configured to detect the technical issue in any suitable way. As an example, technical support facility 306 may detect user input provided by user 110 and indicative of a technical issue of observed by user 110. As another example, technical support facility 306 may be configured to perform a diagnostic process. Technical support facility 306 may be configured to perform any suitable diagnostic operations as part of the diagnostic process. Any diagnostic data generated by the diagnostic process may be stored by technical support facility 306 as diagnostic data 312 in storage facility 308. From the diagnostic data, technical support facility 306 may be configured to detect certain conditions that may be indicative of a technical issue. As another example, technical support facility 306 may be configured to detect certain conditions that may be indicative of a technical issue, without technical support facility 306 performing a diagnostic process.

In response to a detected technical issue, technical support facility 306 may be configured to perform one or more self-recovery operations to attempt to self-recover from the technical issue. A self-recovery operation may include any operation performed by CPE subsystem 106 that may be helpful to recover from a technical issue. Examples of a self-recovery operation may include, without limitation, restarting a process of CPE subsystem 106, rebooting a CPE device included in CPE subsystem 106, resetting a connection associated with CPE subsystem 106 (e.g., a connection between CPE devices within CPE subsystem 106 and/or a connection of a CPE device to a computing device external of CPE subsystem 106, such as a server-side computing device included in provider subsystem 102), and any other operation that may attempt to resolve the technical issue.

Technical support facility 306 may be configured to determine whether a self-recovery operation performed by technical support facility 306 has succeeded or failed to resolve a technical issue. The determination may be made in any suitable way. For example, technical support facility 306 may be configured to perform one or more follow-up operations to determine whether CPE subsystem 106 has recovered from the technical issue. For instance, technical support facility 306 may perform a diagnostic process to generate diagnostic data 312 and to analyze the diagnostic data 312 to determine whether the technical issue has been resolved. As another example, technical support facility 306 may detect a condition indicative of whether the technical issue has been resolved without performing a diagnostic process.

Technical support facility 306 may be configured to report, through communication facility 302, the detected technical issue and any self-recovery operations performed to resolve the technical issue to technical support subsystem 104. The report may indicate whether the technical issue has been resolved. Technical support facility 306 may be further configured to report, through communication facility 302, diagnostic data 312 generated from performance of a diagnostic process.

If technical support facility 306 determines that self-recovery has failed to recover CPE subsystem 106 from the technical issue, technical support facility 306 may notify, through communication facility 302, technical support subsystem 104 of the self-recovery failure. Technical support facility 306 may provide any information associated with the technical issue, CPE subsystem 106, and/or attempts to self-recover from the technical issue to technical support system 104 along with the notification. Technical support subsystem 104 may receive the notification and respond in any of the ways described above to attempt to remotely recover CPE subsystem 106 from the technical issue.

As mentioned, technical support facility 306 may be configured to perform a diagnostic process to generate diagnostic data 312 representative of the state of CPE subsystem 106. Technical support facility 306 may be configured to perform the diagnostic process periodically in accordance with a predetermined frequency or schedule and/or in response to any predetermined event, such as a request for diagnostic data received from technical support subsystem 104. Technical support facility 306 may provide, through communication facility 302, diagnostic data 312 to technical support subsystem 104.

Figure 4:
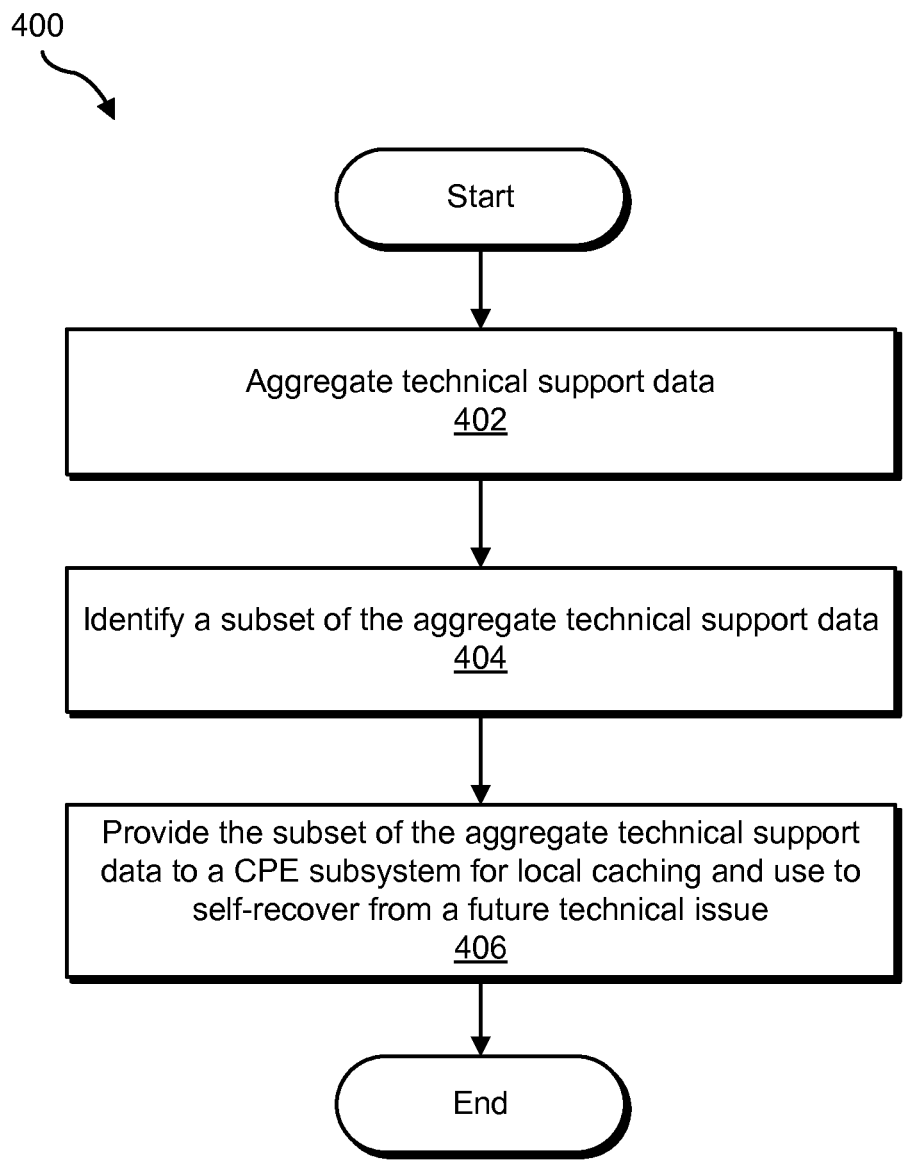
FIGS. 4-5 illustrate exemplary CPE diagnostic, recovery, and reporting methods according to principles described herein.
Figure 5:
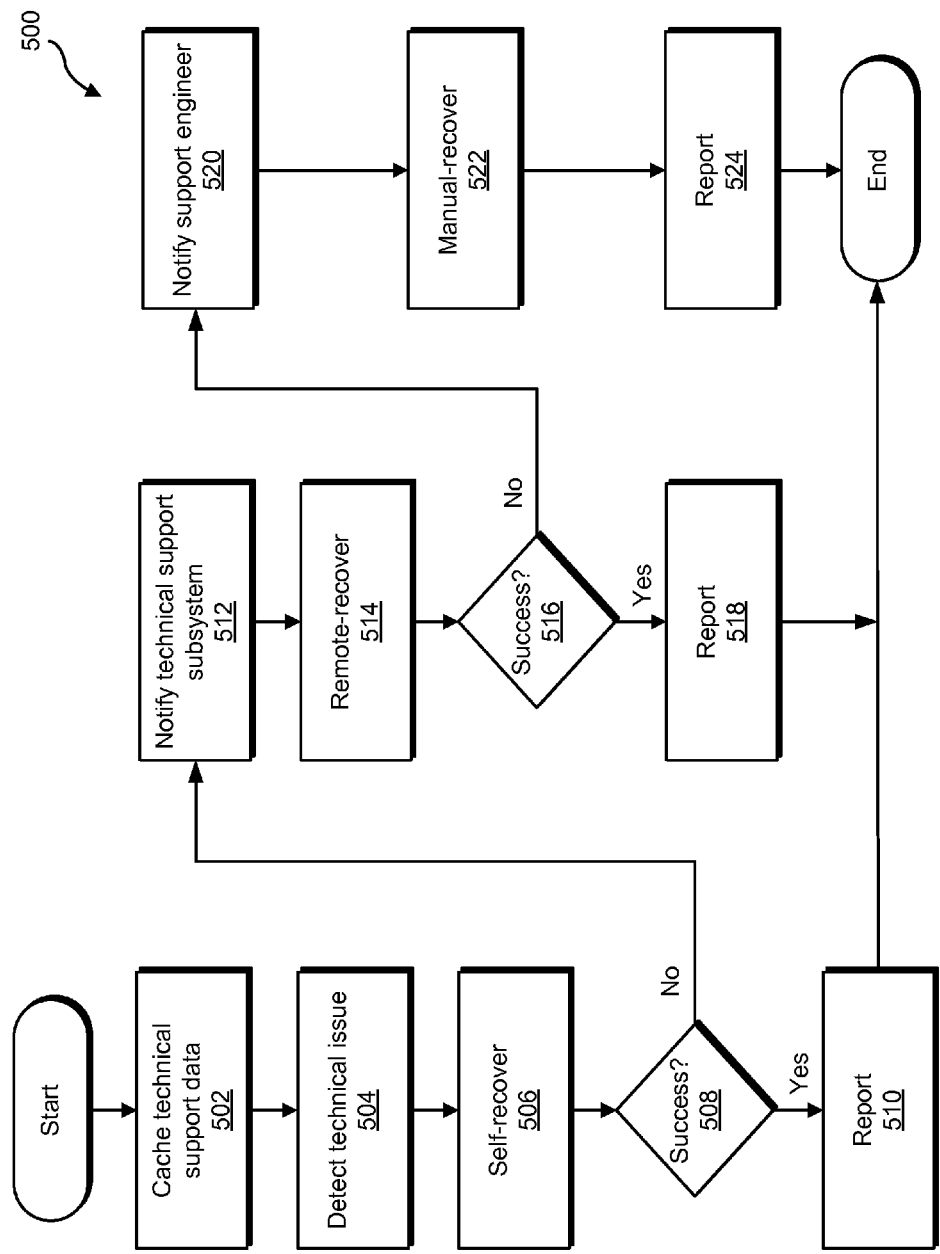

FIGS. 4-5 illustrate exemplary CPE diagnostic, recovery, and reporting methods 400 and 500. While FIGS. 4-5 illustrate exemplary steps according to certain embodiment, other embodiments may omit, add to, reorder, combine, and/or modify any of the steps shown in FIGS. 4-5. The steps shown in FIGS. 4-5 may be performed by any component or combination of components of system 100 and/or any implementation of system 100.

Turning to FIG. 4, in step 402 of method 400, technical support subsystem 104 aggregates technical support data. Step 402 may be performed in any of the ways described herein.

In step 404, technical support subsystem 104 identifies a subset of the aggregate technical support data. Step 404 may be performed in any of the ways described herein.

In step 406, technical support subsystem 104 provides the subset of the aggregate technical support data to a CPE subsystem (e.g., CPE subsystem 106 and/or a specific CPE device included in CPE subsystem 106) for local caching and use by the CPE subsystem to self-recover from a future technical issue experienced by the CPE subsystem. Step 406 may be performed in any of the ways described herein.

Method 400 may be repeated over time to allow new technical support data to be received and aggregated by technical support subsystem 104 and for updated subsets of technical support data to be provided to the CPE subsystem for caching and use to self-recover from future technical issues.

Turning now to FIG. 5, in step 502 of method 500, CPE subsystem 106 caches technical support data received from technical support subsystem 104. Step 502 may be performed in any of the ways described herein such that cached technical support data is available for use by CPE subsystem 106 to self-recover from one or more future technical issues of CPE subsystem 106.

In step 504, CPE subsystem 106 (e.g., a particular CPE device included in CPE subsystem 106) detects a technical issue associated with CPE subsystem 106. Step 504 may be performed in any of the ways described herein.

In step 506, in response to the detected technical issue, CPE subsystem 106 attempts to self-recover from the detected technical issue. Step 506 may be performed in any of the ways described herein.

In step 508, CPE subsystem 106 determines whether the self-recovery performed in step 506 succeeded or failed to resolve the detected technical issue. Step 508 may be performed in any of the ways described herein.

If the self-recovery succeeded, method 500 continues from step 508 to step 510, in which step CPE subsystem 106 reports to technical support subsystem 104. Step 510 may be performed in any of the ways described herein, including by CPE subsystem 106 transmitting technical support data associated with the detected technical issue and self-recovery from the technical issue to technical support subsystem 104, which may add the reported technical support data to the aggregate technical support data 212 maintained by technical support subsystem 104. After step 510, method 500 ends.

If, on the other hand, CPE subsystem 106 determines in step 508 that the self-recovery performed in step 506 failed to resolve the detected technical issue, method 500 may continue from step 508 to step 512. In step 512, CPE subsystem 106 notifies technical support subsystem 104 of the detected technical issue and self-recovery failure. Step 512 may be performed in any of the ways described herein.

Technical support subsystem 104 may receive the notification from CPE subsystem 106 and remotely recover the CPE subsystem 106 from the technical issue in step 514. Step 514 may be performed in any of the ways described herein to attempt to remotely help CPE subsystem 106 to recover from the technical issue.

In step 516, technical support subsystem 104 determines whether the remote recovery performed in step 514 succeeded or failed to resolve the technical issue. Step 516 may be performed in any of the ways described herein.

If the remote-recovery succeeded, method 500 may continue from step 516 to step 518, in which step technical support subsystem 104 reports technical support data representing the technical issue and recovery from the technical issue. Step 518 may include remote technical support facility 208 providing such technical support data to technical support data management facility 206 for aggregation with aggregate technical support data 212. After step 518, method 500 ends.

If, on the other hand, in step 516, technical support subsystem 104 determines that the remote recovery performed in step 514 failed, method 500 continues from step 516 to step 520. In step 520, technical support subsystem 104 notifies a support engineer (e.g., support engineer 114) of the detected technical issue and attempts to resolve the technical issue. Step 520 may be performed in any of the ways described herein.

In step 522, the support engineer manually assists CPE subsystem 106 to recover from the technical issue. Step 522 may include the support engineer performing one or more actions to remotely resolve the technical issue. Such actions may include the support engineer interacting with technical support subsystem 104 to control one or more operations of CPE subsystem 106 through technical support subsystem 104.

In step 524, the support engineer reports technical support data representing the technical issue and attempts to resolve the technical issue to technical support subsystem 104. The support engineer may report the technical support data regardless of whether the technical issue has been successfully resolved. Step 524 may be performed in any of the ways described herein.

As described above, technical support subsystem 104 may receive the technical support data provided by the support engineer and add the technical support data to the aggregate technical support data 212 maintained by technical support subsystem 104.

By CPE subsystem 106 attempting to self-recover from the detected technical issue before contacting technical support subsystem 104 and/or support engineer 114, and before relying on involvement of user 110 to resolve the technical issue, the involvement of user 110 to resolve the technical issue may be minimized or eliminated. In addition, the number of technical support requests sent to and received by technical support subsystem 104 and/or support engineer 114 may be minimized, thereby conserving resources of technical support subsystem 104 and/or support engineer 114. In addition, by technical support subsystem 104 attempting to remotely recover CPE subsystem 106 from the technical issue before relying on involvement of support engineer 114 and/or user 110 to help resolve the technical issue, the involvement of user 110 to help resolve the technical issue may be minimized or eliminated. In addition, resources of support engineer 114 and/or other technical support personnel may be conserved. In certain examples, the technical issue may be resolved by CPE subsystem 106, technical support subsystem 104, and/or support engineer 114 transparently to user 110.

In certain embodiments, CPE subsystem 106 may include multiple discrete CPE devices located at customer premises 112. Such CPE devices may be configured to communicate with one another at the customer premises 112 in any suitable way, such as by way of a LAN at the customer premises 112.

In certain examples, the CPE devices may be heterogeneous. For example, the CPE devices may include different types of CPE devices. As a particular example, the CPE devices may include both managed and unmanaged CPE devices, which may mean that one or more of the CPE devices are managed by (i.e., controlled by) a service provider operating provider subsystem 102 and that one or more others of the CPE devices are not managed by (i.e., not controlled by) the service provider operating provider subsystem 102. To illustrate, CPE subsystem 106 may include a set-top box device or digital video recorder device that is provided by and fully controlled by the service provider and a personal computer that is not provided by nor controlled by the service provider.

Figure 6:
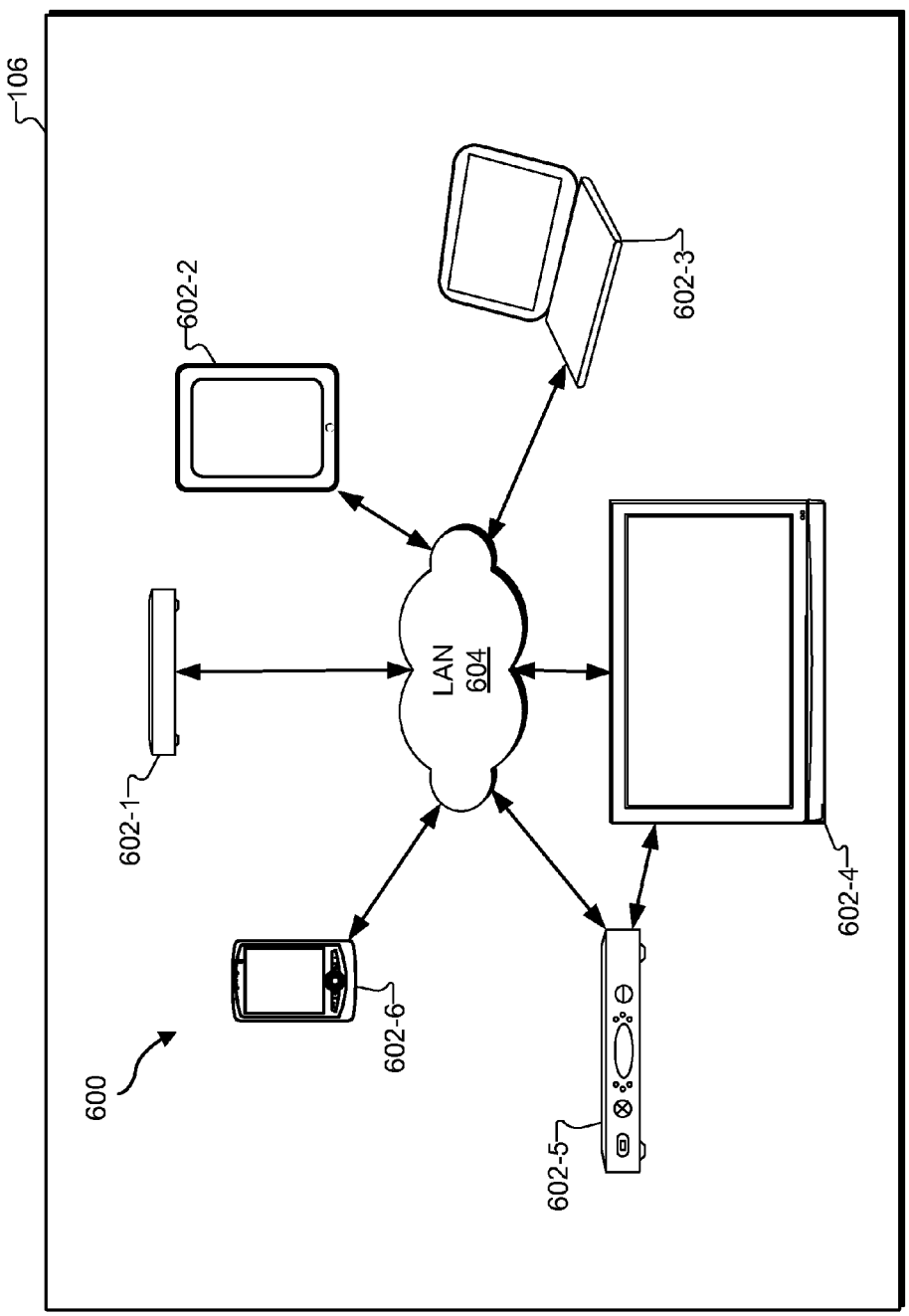
FIG. 6 illustrates an exemplary configuration CPE devices that may be included in a CPE subsystem at a customer premises according to principles described herein.

FIG. 6 illustrates an exemplary configuration 600 of CPE devices 602 (e.g., CPE devices 602-1 through 602-6) that may be included in CPE subsystem 106 at customer premises 112. In the illustrated example, CPE devices 602 are configured to communicate with one another by way of a LAN 604, which may include an Ethernet and/or Wi-Fi LAN in some implementations.

In the illustrated example, CPE devices 602 are heterogeneous in that CPE devices 602 include CPE devices of different types. For example, CPE device 602-1 may comprise a router (e.g., a wireless and/or Ethernet router) configured to provide LAN 604 and to enable communications between CPE devices 602 connected to LAN 604. CPE device 602-1 they also include a modem, broadband connection equipment, and/or their components configured to form a connection with one or more computing devices external of CPE subsystem 106. In addition, CPE devices 602 may include CPE device 602-2 comprising a tablet computer, CPE device 602-3 comprising a laptop computer, CPE device 602-4 comprising a television or other display device, CPE device 602-5 comprising a set-top box device and/or DVR device, and CPE device 602-6 comprising a mobile phone.

In certain examples, one or more of the CPE devices 602 may be managed by a service provider and one or more others of the CPE devices 602 may not be managed by the service provider. For example, CPE device 602-1 and CPE device 602-5 may be provided and managed by the service provider in certain examples, while CPE devices 602-2, 602-3, 602-4, and 602-6 may be obtained from one or more other sources by user 110 and not be managed by the service provider.

Device configurations such as configuration 600 shown in FIG. 6 may present specific challenges for a technical support provider providing technical support services related to a service provided by provider subsystem 102 for access by user 110 of CPE devices 602. For example, CPE devices 602 may include a variety of different CPE devices and/or types of CPE devices, which may include a variety of different capabilities, functions, hardware components, hardware configurations, operating systems, and/or software applications. When user 110 attempts to utilize such CPE devices to access a service provided by provider subsystem 102, a wide variety of technical issues may be introduced and/or encountered that would not otherwise be introduced or encountered if only managed CPE devices provided and managed by the service provider were used to access the service.

To illustrate, a particular implementation of CPE devices 602 will now be described. In the exemplary implementation, CPE device 602-5 may be provided and managed by the service provider operating provider subsystem 102. For example, CPE device 602-5 may comprise a managed set-top box device and/or DVR device configured to access one or more services provided by provider subsystem 102. CPE device 602-5 may be communicatively coupled to CPE device 602-4, which may include a television or other display screen, such that CPE device 602-5 may provide output signals (e.g., audio/video signals) to CPE device 602-4 for processing by CPE device 602-4 for presentation of media content for experiencing by user 110.

CPE device 602-5 may be further configured to function as a media server. For example, a media server application may be installed and may execute on CPE device 602-5 such that CPE device 602-5 provides media server functionality. Such functionality may include CPE device 602-5 receiving media content feeds from one or more of the other CPE devices 602 by way of LAN 604, processing the media content feeds, and providing output signals to CPE device 602-4 for processing and presentation of the media content for experiencing by the user. For example, CPE device 602-3 in the form of a laptop computer may have a movie stored within the memory of the laptop computer. Utilizing the media server functionality of CPE device 602-5, user 110 may initiate streaming of the movie from the laptop computer to CPE device 602-5, which may process the stream and provide output signals to television 602-4 such that the user 110 may watch the movie on television 602-4.

In some examples, the media server functionality of CPE device 602-5 and additionally or alternatively enable CPE device 602-5 to stream media content (e.g., media content received from service provider subsystem 102 as part of a media content service and/or stored on CPE device 602-5) to one or more of the other CPE devices 602 by way of LAN 604. For example, CPE device 602-5 may have a recorded television program stored thereon. CPE device 602-5 may stream the television program over LAN 604 to tablet computer 602-2 such that user 110 may watch the television program on tablet computer 602-2.

One or more technical issues associated with one or more of the CPE devices 602 may affect the media server functionality provided by CPE device 602-5. In certain examples, the heterogeneous nature of the CPE devices 602 may cause technical issues that may undesirably affect the media server functionality of CPE device 602-5 and/or the ability of one or more of the CPE devices 602 to use the media server functionality.

System 100 may be implemented in such a way so as to facilitate detection of, recovery from, and/or reporting of such technical issues. To this end, system 100 may be configured and/or implemented to provide an architecture by which diagnostic data may be collected from CPE devices 602 and/or by which technical support communications may be received from and provided to CPE devices 602.

To this end, in certain implementations, a managed CPE device 602 may implement communication facility 302, technical support data caching facility 304, technical support facility 306, and storage facility 308. Accordingly, the managed CPE device 602, such as CPE device 602-5, may be configured to function as described above to diagnose, resolve, and/or report technical issues associated with CPE device 602-5. In addition, CPE device 602-5 may be configured to communicate with other CPE devices 602 by way of LAN 604 to obtain technical support data and/or diagnostic data of the other CPE devices 602 and/or to provide technical support communications to the other CPE devices 602. CPE device 602-5 may be configured to communicate with the other CPE devices 602 in one or more ways to facilitate communications with a variety of CPE devices and/or types of CPE devices.

Figure 7:
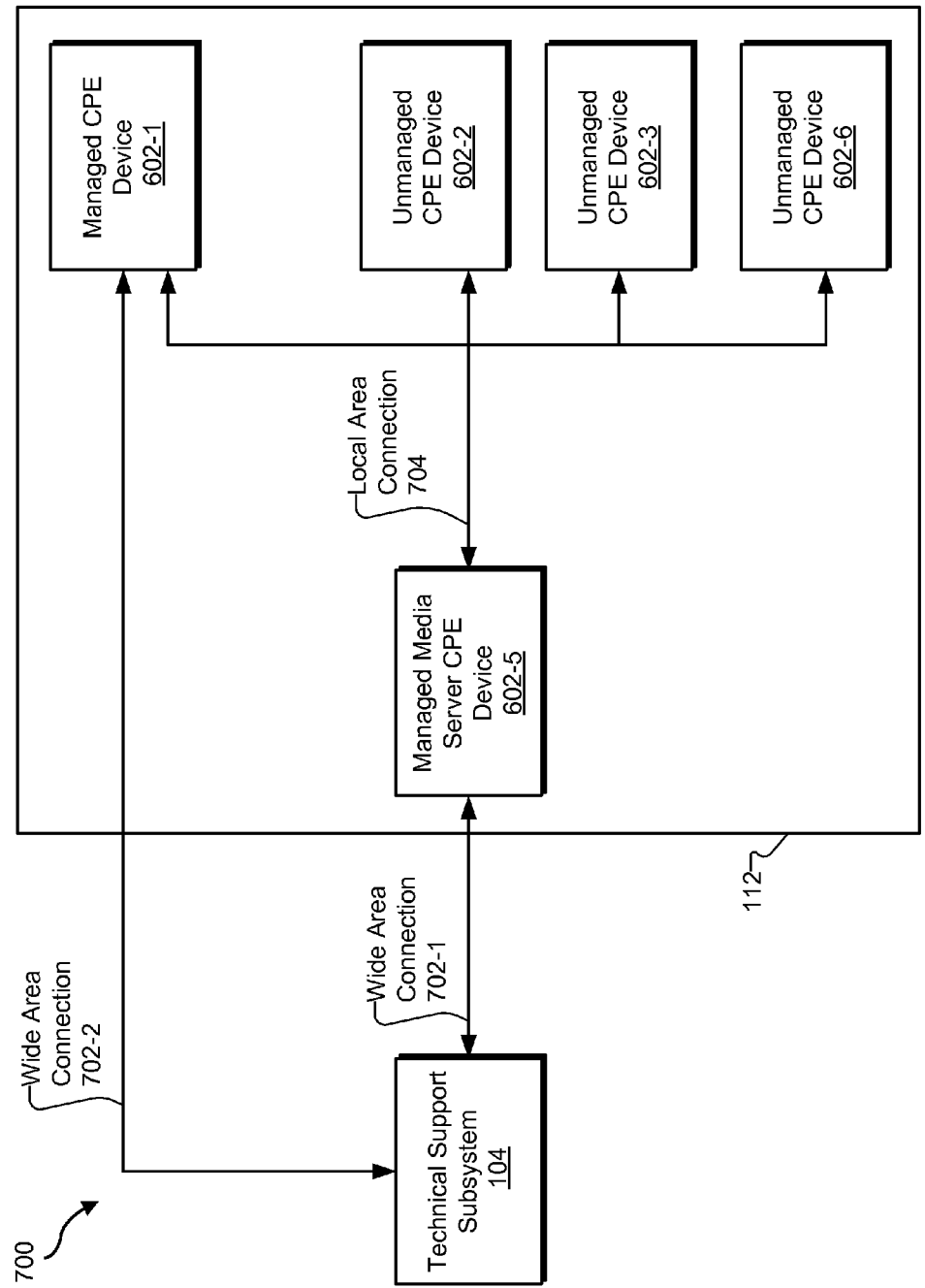
FIG. 7 illustrates an exemplary architecture in which system of FIG. 1 is implemented according to principles described herein.

FIG. 7 illustrates an exemplary architecture 700 in which a managed media server CPE device 602-5 is configured with functionality of communication facility 302, technical support data caching facility 304, technical support facility 306, and storage facility 308. Managed CPE device 602-5 may be further configured to function as an intermediary technical support device between technical support subsystem 104 and one or more other CPE devices 602 (e.g., CPE devices 602-2, 602-3, and 602-6) located at customer premises 112.

As shown in FIG. 7, technical support subsystem 104 may be configured to communicate with managed CPE device 602-5 by way of a wide area connection 702-1 (e.g., over network 108). Communications between technical support subsystem 104 and managed CPE device 602-5 over wide area connection 702-1 may use a remote CPE device management protocol such as CPE WAN Management Protocol ("CWMP") defined by Technical Report 069 ("TR-069") and commonly referred to as "TR-069." In such a configuration, technical support subsystem 104 may be configured to function as an auto-configuration server ("ACS") capable of using TR-069 or other suitable remote CPE device management protocol to auto-configure CPE devices such as CPE device 602-5 remotely over a wide area connection.

Technical support subsystem 104 may be configured to receive technical support data, diagnostic data, and/or communications from managed CPE device 602-5 and to send technical support and device control communications to managed CPE device 602-5 by way of wide area connection 702-1. In addition, in certain examples, technical support subsystem 104 may be configured to communicate in similar fashion with other managed CPE devices 602 located at customer premises 112 by way of wide area connections. For example, technical support subsystem 104 may communicate with managed CPE device 602-1 by way of another wide area connection 702-2, as shown in FIG. 7.

Due at least in part to the unmanaged nature of other CPE devices 602 (e.g., unmanaged CPE devices 602-2, 602-3, and 602-6) located at customer premises 112, or for other reasons, technical support subsystem 104 may not be configured or able to communicate with the unmanaged CPE devices 602 by way of a wide area connection using TR-069 or other suitable remote CPE management protocol. However, architecture 700 may be configured such that technical support subsystem 104 may receive technical support data, diagnostic data, and/or communications from the unmanaged CPE devices 602 and send technical support and device control communications to the unmanaged CPE devices 602 indirectly by way of managed CPE device 602-5. To this end, managed CPE device 602-5 may be configured to function as an intermediary between technical support subsystem 104 and one or more other CPE devices 602 located at customer premises 112.

As shown in FIG. 7, managed CPE device 602-5 may be configured to communicate with managed CPE device 602-1 and unmanaged CPE devices 602-2, 602-3, and 602-6 by way of a local area connection 704, which may include one or more local area connections such as one or more local connections over LAN 604. Managed CPE device 602-5 may be configured to communicate with other CPE devices 602 by way of local area connection 704 using suitable local communications protocols, which may include local device discovery and management protocols. For example, the local communications may be by way of Universal Plug and Play ("UPnP") protocols (e.g., UPnP Device Management: 2 protocol), web sockets, TCP/UDP notifications, polling, and/or any other suitable local communications technologies that provide support for discoverability of CPE devices, collection of diagnostics from CPE devices, and/or remote control of CPE devices (e.g., by managed CPE device 602-5).

Managed CPE device 602-5 may be configured to collect technical support data and/or diagnostic data from other CPE devices 602 at customer premises 112 by way of local communication pathway 704. Data collection operations may be triggered by managed CPE device 602-5 periodically (e.g., during off-peak hours) and/or in response to predetermined events on the initiative of CPE device 602-5 and/or in response to data collection requests from technical support subsystem 104. Periodic collection of data from CPE devices 602 over time may allow managed CPE device 602-5 and/or technical support subsystem 104 to model interactions between managed CPE device 602-5 and other CPE devices 602 over time, which may be helpful for resolving future technical issues. Collection of data from CPE device 602 in response to predetermined events may allow diagnostic data to be collected during a detected technical issue, such as when live television programming is blank on some channels, changing channels is slow, support engineer 114 instructs technical support subsystem 104 to get diagnostic data, and any other predetermined technical issue related event.

Examples of data that may be collected from CPE devices 602 may include, without limitation, signal strength data, in-band signal status data, out-of-band signal status data, audio/video status data (e.g., video lock data, audio lock data, etc.), video quality parameter data, audio quality parameter data, network connectivity data, user interface status data, media interface status data (e.g., HDMI status data, etc.), network interface status data, security status data, subscription data, provisioning status data, performance monitoring data (e.g., CPU usage, etc.), log data, system information data, and any other data related to the states of CPE devices 602.

Figure 8:
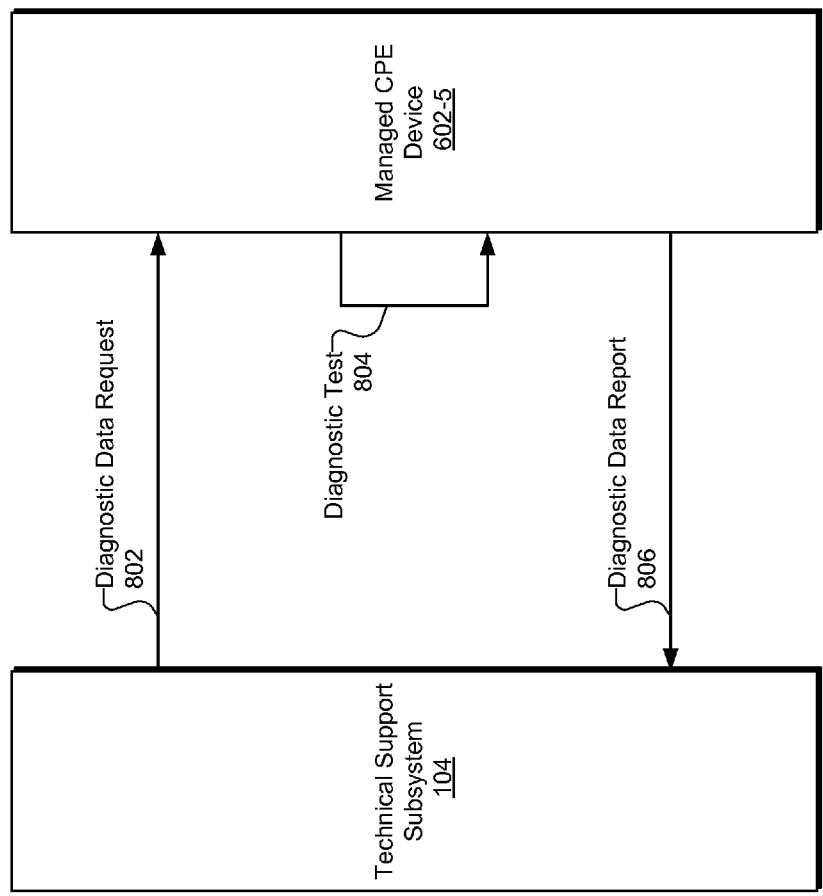
FIGS. 8-10 illustrate exemplary methods of collecting diagnostic data according to principles described herein.
Figure 9:
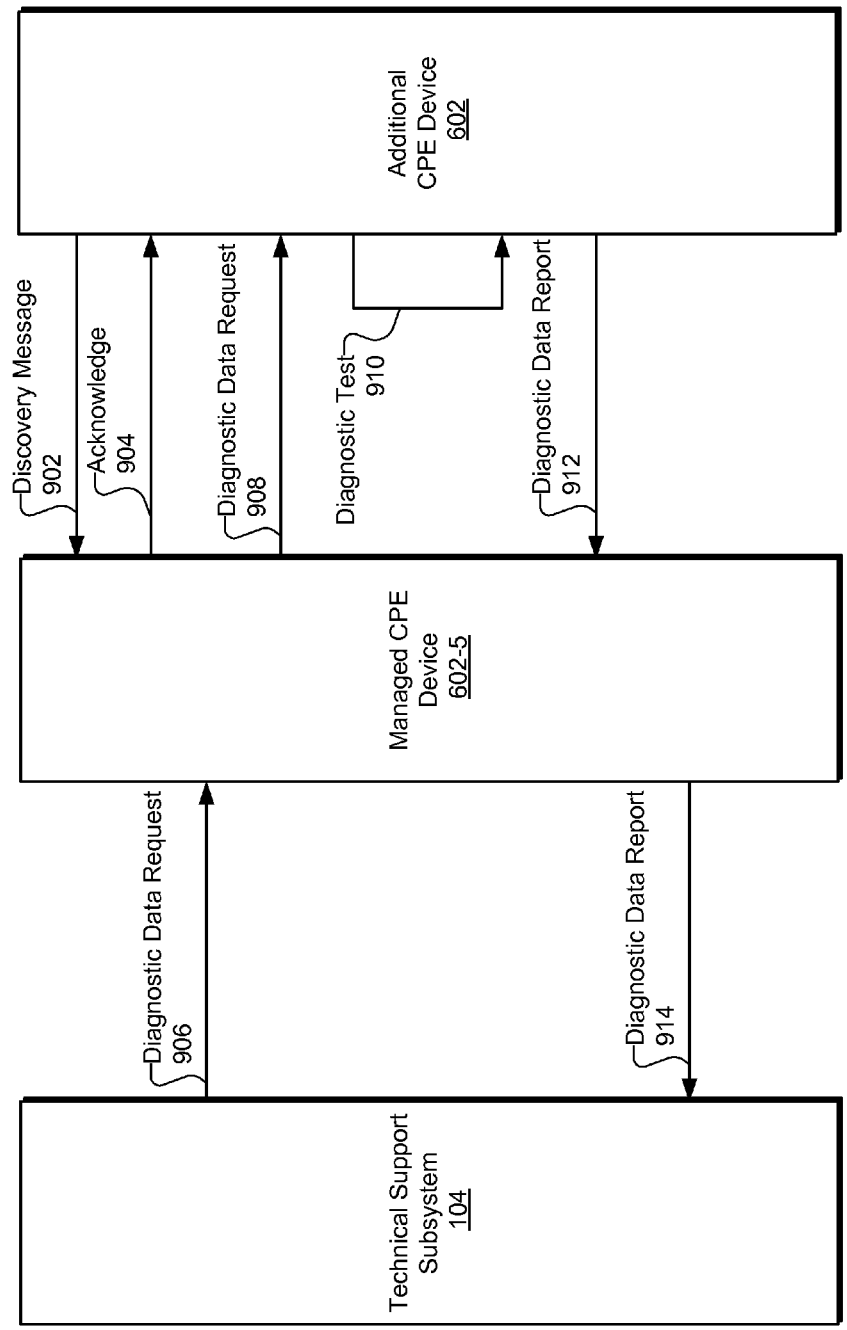
Figure 10:
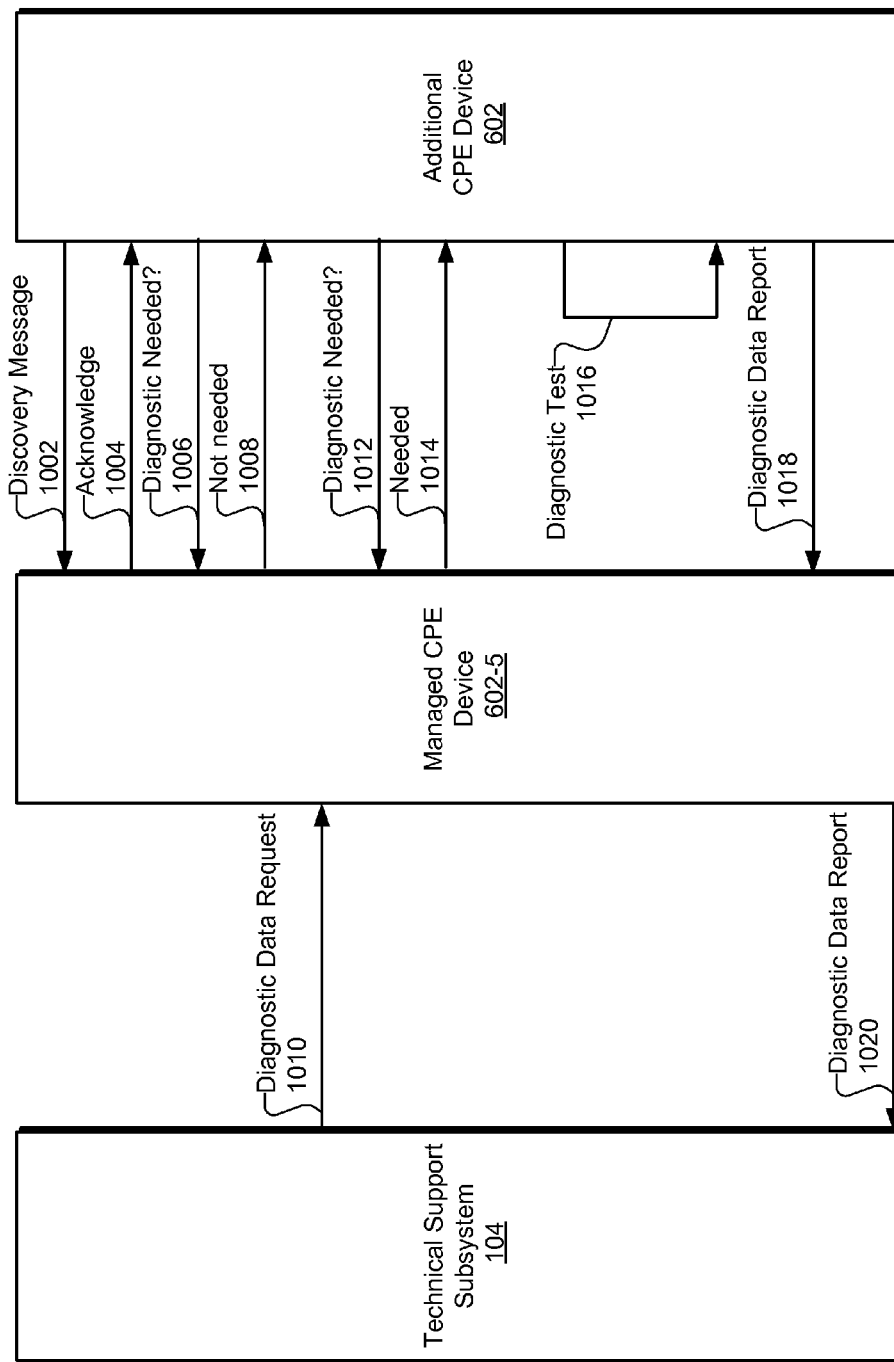

The local communication protocols and/or technologies used to collect the data may depend on the CPE device 602 (e.g., capabilities and/or type of CPE device 602) from which the data is collected. FIGS. 8-10 illustrate exemplary methods of technical support subsystem 104 and/or managed CPE device 602-5 collecting diagnostic data from different CPE devices 602.

Turning to FIG. 8, technical support subsystem 104 may transmit a diagnostics request, via wide area connection 702-1, to managed CPE device 602-5 (step 802). In response, managed CPE device 602-5 may perform a diagnostics test to collect diagnostics data for managed CPE device 602-5 (step 804) and transmit the diagnostics data, via wide area connection 702-1, to technical support subsystem 104 (step 806). Technical support subsystem 104 may collect diagnostics data directly from another managed CPE device, such as managed CPE device 602-1, by way of another wide area connection, such as wide area connection 702-2.

Turning to FIG. 9, a CPE device 602 may send, via local area connection 704, a device discoverability message that indicates capabilities of CPE device 602 to managed CPE device 602-5 (step 902). Managed CPE device 602-5 may respond, via local area connection 704, with an acknowledgement message (step 904). Subsequently, technical support subsystem 104 may transmit a diagnostics request, via wide area connection 702-1, to managed CPE device 602-5 (step 906). Managed CPE device 602-5 may receive and forward the diagnostic request to an additional CPE device 602 via local area connection 704 in accordance with the discovered capabilities of the CPE device 602 (step 908). In response to diagnostic request, the CPE device 602 may perform a diagnostics test (step 910) to collect diagnostics data for the CPE device 602. CPE device 602 may then transmit the collected diagnostics data for the CPE device 602, via local area connection 704, to managed CPE device 602-5 (step 912). Managed CPE device 602-5 may then transmit the diagnostic data for the CPE device 602 to technical support subsystem 104 via wide area connection 702-1 (step 914).

The method illustrated in FIG. 9 may be performed to obtain diagnostic data from any CPE device, including a managed or unmanaged CPE device that is capable of remote network device management communications with a managed CPE device. For example, managed CPE device 602-5 may communicate with CPE device 602-1 comprising a router via local area connection 704 to request and obtain network statistics data for LAN 604 and/or CPE devices 602 connected to LAN 604. Managed CPE device 602-5 may be configured to use the network statistics to determine whether a technical issue related to connectivity exists (e.g., wireless signal strength is too low or bandwidth usage is too high). As another example, managed CPE device 602-5 may collect diagnostic data from CPE device 602-3 comprising a laptop computer and use the data to analyze audio/video quality and retransmit audio/video packets in case of detected poor quality.

In certain embodiments, diagnostic data may be collected from managed CPE device 602-1 by way of local area connection 704 as a backup or secondary option to direct collection of diagnostic data from managed CPE device 602-1 by way of wide area connection 702-2.

FIG. 10 illustrates a method for collecting data diagnostic data from a CPE device 602 that has polling capabilities but lacks other capabilities (e.g., UPnP DM:2 capabilities). CPE device 602 may send, via local area connection 704, a device discoverability message that indicates capabilities of CPE device 602 to managed CPE device 602-5 (step 1002). Managed CPE device 602-5 may respond, via local area connection 704, with an acknowledgement message (step 1004). Subsequently, CPE device 602 may send, via local area connection 704, a polling request asking whether diagnostic data is needed (step 1006). Managed CPE device 602-5 may receive and respond to the polling request (step 1008) to indicate that diagnostic data is not needed. CPE device 602 may periodically repeat the sending of a polling request to managed CPE device 602-5 at a predetermined frequency. As shown in FIG. 10, technical support subsystem 104 may send, via wide area connection 702-1, a request for diagnostic data (step 1010). Subsequently to managed CPE device 602-5 receiving this request from technical support subsystem 104, CPE device 602 may send, via local area connection 704, another polling request to managed CPE device 602-5 asking whether diagnostic data is needed (step 1012). Managed CPE device 602-5 may receive and respond to the polling request (step 1014) to indicate that diagnostic data is needed (to fulfill the request in step 1010). In response to this request for diagnostic data from managed CPE device 602-5, the CPE device 602 may perform a diagnostics test (step 1016) to collect diagnostics data for the CPE device 602. CPE device 602 may then transmit the collected diagnostics data for the CPE device 602, via local area connection 704, to managed CPE device 602-5 (step 1018). Managed CPE device 602-5 may then transmit the diagnostic data for the CPE device 602 to technical support subsystem 104 via wide area connection 702-1 (step 1020). The method illustrated in FIG. 10 may be performed to obtain diagnostic data from any CPE device 602 capable of polling managed CPE device 602 by way of local area connection 704.

Managed CPE device 602-5 may aggregate and forward collected data, which may include technical support data and/or diagnostic data for managed CPE device 602-5 and one or more other CPE devices 602, to technical support subsystem 104, which may aggregate and use the data as described herein. For example, technical support subsystem 104 may identify a subset of aggregate technical support data collected by technical support subsystem 104 and provide the subset of the data to managed CPE device 602-5 for use by managed CPE device 602-5 for self-recovery operations to attempt to recover managed CPE device 602-5 and/or one or more other CPE devices 602 from future technical issues.

To illustrate, managed CPE device 602-5 may cache technical support data received form technical support subsystem 104. Managed CPE device 602-5 may detect a technical issue that adversely affects the media server functionality provided by managed CPE device 602-5. The technical issue may be caused by or otherwise associated with managed CPE device 602-5 and/or one or more other CPE devices 602 located at customer premises 112. Managed CPE device 602-5 may use the locally cached technical support data to attempt to self-recover from the technical issue by performing one or more self-recovery operations. The self-recovery operations may include CPE device 602-5 performing one or more operations internally and/or directing one or more of the other CPE devices 602 to perform one or more operations. For example, managed CPE device 602-5 may direct CPE device 602-1 comprising a router to reboot in an attempt to resolve a connectivity issue associated with LAN 604. As another example, managed CPE device 602-5 may direct CPE device 602-3 comprising a laptop computer to restart a process associated with the media server functionality of managed CPE device 602-5 (e.g., a movie streaming process).

Self-recovery by managed CPE device 602-5 may help reduce technical support calls to technical support subsystem 104 and/or support agent 114, as described above. Self-recovery by managed CPE device 602-5 may also help minimize or eliminate involvement by user 114 to resolve a technical issue.

In certain embodiments, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
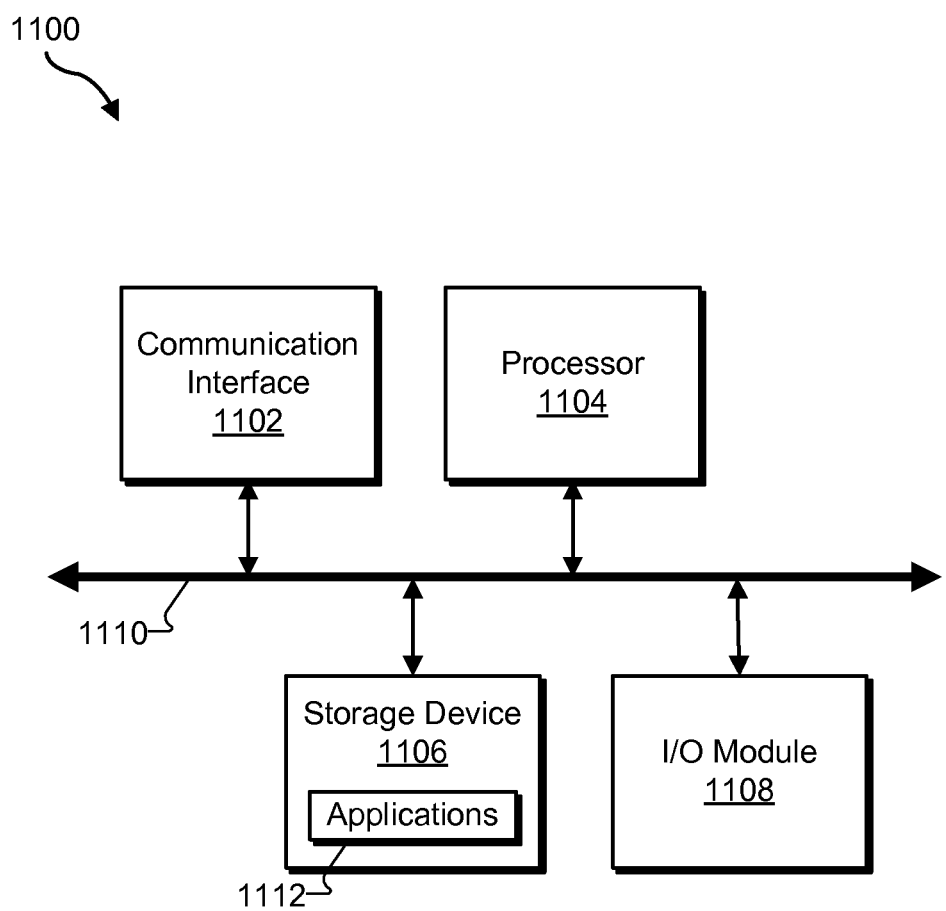
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, and any other suitable interface. Communication interface 1102 may be configured to interface with any suitable communication media, protocols, and formats, including any of those mentioned above.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., a touch screen display), a receiver (e.g., an RF or infrared receiver), and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the features described herein may be implemented and/or performed by one or more components of computing device 1100. For example, one or more applications 1112 residing within storage device 1106 may be configured to direct processor 1104 to perform one or more processes or functions associated with CPE interface facility 202, support engineer interface facility 204, technical support data management facility 206, remote technical support facility 208, communication facility 302, technical support data caching facility 304, and/or technical support facility 306. Likewise, storage facility 210 and/or storage facility 308 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   aggregating, by a technical support server subsystem over time, technical support data representing technical issues of customer premises equipment ("CPE") devices and operations performed to resolve the technical issues;
   identifying, by the technical support server subsystem, a subset of the technical support data; and
   providing, by the technical support server subsystem, the identified subset of the technical support data to a CPE device for local storage by the CPE device, the locally stored technical support data configured to be used by the CPE device to self-recover from a future technical issue associated with the CPE device;

wherein the identifying of the subset of the technical support data comprises identifying the subset of the technical support data based on a type of an additional CPE device communicatively coupled to the CPE device within a customer premises.

2. The method of claim 1, further comprising:
receiving and locally storing, by the CPE device, the subset of the technical support data provided by the technical support server subsystem;
detecting, by the CPE device, a technical issue;
using, by the CPE device in response to the detecting of the technical issue, the locally stored technical support data to identify a self-recovery operation; and
performing, by the CPE device, the identified self-recovery operation.

3. The method of claim 2, further comprising:
determining, by the CPE device, that the self-recovery operation failed to resolve the detected technical issue; and
notifying, by the CPE device in response to the determining that the self-recovery operation failed to resolve the detected technical issue, the technical support server subsystem of the detected technical issue.

4. The method of claim 3, further comprising:
receiving, by the technical support server subsystem, notification of the detected technical issue from the CPE device;
using, by the technical support server subsystem, the aggregate technical support data to identify a remote-recovery operation; and
performing, by the technical support server subsystem, the identified remote-recovery operation.

5. The method of claim 4, further comprising:
determining, by the technical support server subsystem, that the remote-recovery operation failed to resolve the detected technical issue; and
notifying, by the technical support server subsystem in response to the determining that the remote-recovery operation failed to resolve the detected technical issue, a technical support engineer associated with the technical support server subsystem of the detected technical issue.

6. The method of claim 5, further comprising:
receiving, by the technical support server subsystem, new technical support data representing the detected technical issue and a recovery operation performed by the technical support engineer to resolve the detected technical issue; and
adding, by the technical support server subsystem, the new technical support data to the aggregate technical support data.

7. The method of claim 6, further comprising:
identifying, by the technical support server subsystem, a new subset of the aggregate technical support data; and
providing, by the technical support server subsystem, the new subset of the aggregate technical support data to the CPE device for use by the CPE device to update the locally stored technical support data.

8. The method of claim 1, wherein the identifying of the subset of the technical support data further comprises identifying the subset of the technical support data based on a type of the CPE device.

9. The method of claim 1, wherein the identifying of the subset of the technical support data further comprises selecting a subset of technical issues represented by the aggregate technical support data for inclusion in the subset of the technical support data, the selected subset of the technical issues being historically more common than a remainder of the technical issues.

10. The method of claim 1, wherein the CPE device is configured to function as a media server device at the customer premises.

11. The method of claim 1, further comprising:
receiving, by the CPE device by way of a wide area connection, a request for diagnostic data from the technical support subsystem;
forwarding, by the CPE device, the request for diagnostic data to the additional CPE device by way of a local area connection;
receiving, by the CPE device from the additional CPE device by way of the local area connection, the requested diagnostic data; and
transmitting, by the CPE device, the diagnostic data to the technical support subsystem by way of the wide area connection.

12. The method of claim 1, further comprising:
receiving and locally storing, by the CPE device, the subset of the technical support data provided by the technical support server subsystem;
detecting, by the CPE device, a technical issue associated with the additional CPE device communicatively coupled to the CPE device by a local area connection;
using, by the CPE device in response to the detecting of the technical issue, the locally stored technical support data to identify a self-recovery operation; and
performing, by the CPE device, the identified self-recovery operation, the self-recovery operation comprising directing the additional CPE device, by way of the local area connection to perform an operation to attempt to resolve the technical issue.

13. The method of claim 12, wherein the operation comprises one of rebooting the additional CPE device, restarting a process executing on the additional CPE device, and resetting a connection of the additional CPE device.

14. The method of claim 1, wherein the additional CPE device comprises a local area network router.

15. The method of claim 1, embodied as computer-executable instructions on at least one non-transitory computer-readable medium.

16. A system comprising:
a technical support server subsystem configured to aggregate, over time, and maintain technical support data representing technical issues of customer premises equipment ("CPE") subsystems and operations performed to resolve the technical issues; and
a CPE device included in one of the CPE subsystems and communicatively coupled to the technical support server subsystem, the CPE device configured to:
receive a subset of the aggregate technical support data from the technical support server subsystem,
locally store the subset of the aggregate technical support data,
detect a technical issue associated with the CPE device,
use, in response to the detected technical issue, the locally stored subset of the aggregate technical support data to identify a self-recovery operation, and
perform the identified self-recovery operation;
wherein the subset of the aggregate technical support data is selected for local storage by the CPE device based on a type of an additional CPE device communicatively coupled to the CPE device within a customer premises.

17. The system of claim 16, wherein:
the technical support server subsystem is controlled by a service provider; and
the CPE device is located within the customer premises associated with a customer of the service provider and is managed by the service provider.

18. The system of claim 17, wherein the CPE device is further configured to:
detect an additional technical issue associated with the additional CPE device communicatively coupled to the CPE device by a local area network,
use, in response to the detected additional technical issue, the locally stored subset of the aggregate technical support data to identify an additional self-recovery operation, and
perform the additional self-recovery operation, the additional self-recovery operation comprising directing the additional CPE device, by way of the local area network, to perform an operation to attempt to resolve the technical issue.

19. The system of claim 18, wherein the additional CPE device is located within the customer premises associated with the customer of the service provider and is not managed by the service provider.

20. A system comprising:
a technical support server subsystem configured to provide remote technical support to a customer premises equipment ("CPE") subsystem in relation to a service provided by a service provider server subsystem for access by the CPE subsystem; and
a CPE device included in the CPE subsystem and communicatively coupled to the technical support subsystem by way of a wide area connection and to an additional CPE device included in the CPE subsystem by way of a local area connection, the CPE device configured to function as an intermediary technical support device between the technical support subsystem and the additional CPE device;
wherein the CPE device is configured to receive technical support data that is provided from the technical support server subsystem based on a type of the additional CPE device communicatively coupled to the CPE device by way of the local area connection.

21. The system of claim 20, wherein:
the service provider subsystem is operated by a service provider;
the CPE device is managed by the service provider; and
the additional CPE device is not managed by the service provider.

22. The system of claim 20, wherein:
the CPE device and the additional CPE device are located at a customer premises; and
the CPE device is configured to function as a media server device at the customer premises.

* * * * *